(12) United States Patent
Felse et al.

(10) Patent No.: US 10,007,898 B2
(45) Date of Patent: Jun. 26, 2018

(54) DATABASE RETRIEVAL SYSTEM

(71) Applicant: Bank of America Corporation, Charlotte, NC (US)

(72) Inventors: Mark D. Felse, Indian Land, SC (US); Richard A. Banks, Newark, DE (US); James Benton, Matthews, NC (US); Theresa Brennan, Garnet Valley, PA (US); Sarah Christine, Smyrna (DE); Dewayne A. Furr, Burleson, TX (US); Melody Gentile, Newark, DE (US); Michele N. Hanshew, Smyrna, DE (US); Kerry Kurt Simpkins, Fort Mill, SC (US); John Barrett Hall, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 367 days.

(21) Appl. No.: 14/834,620

(22) Filed: Aug. 25, 2015

(65) Prior Publication Data

US 2017/0061400 A1    Mar. 2, 2017

(51) Int. Cl.
*G06Q 20/10* (2012.01)
*G06F 3/0481* (2013.01)
*G06F 3/0484* (2013.01)

(52) U.S. Cl.
CPC .......... *G06Q 20/10* (2013.01); *G06F 3/0481* (2013.01); *G06F 3/0484* (2013.01)

(58) Field of Classification Search
CPC combination set(s) only.
See application file for complete search history.

(56) References Cited

U.S. PATENT DOCUMENTS

| | | | |
|---|---|---|---|
| 6,195,467 B1 * | 2/2001 | Asimopoulos | G06T 5/20 382/192 |
| 7,165,723 B2 * | 1/2007 | McGlamery | G06K 9/03 235/379 |
| 8,517,260 B1 * | 8/2013 | Brown | G06Q 40/02 235/379 |
| 8,606,705 B2 | 12/2013 | Zanzot et al. | |
| 8,606,706 B2 | 12/2013 | Zanzot et al. | |
| 8,676,706 B2 | 3/2014 | Jones et al. | |

(Continued)

*Primary Examiner* — William E Rankins
(74) *Attorney, Agent, or Firm* — Weiss & Arons LLP; Michael A. Springs, Esq.

(57) ABSTRACT

A method for database retrieval is provided. The method may include receiving a history datastore. The method may include receiving a payment, i.e., a paper check. The method may include simultaneously scanning the check into a grayscale image and black and white image. The method may include reviewing each pixel on the black and white image alone and in combination with surrounding pixels to determine an arrangement of shaded pixels. When the arrangement of shaded pixels is determined to be above a predetermined threshold of similarity to a predefined set of characters, the method may determine a subset of characters and store the subset of characters in a memory. The method may include crawling the history datastore to determine information which corresponds to the subset of characters stored in memory and retrieving the corresponding information. The method may include showing the corresponding information and the payment on a GUI.

1 Claim, 8 Drawing Sheets

(56) References Cited

U.S. PATENT DOCUMENTS

| | | | |
|---|---|---|---|
| 2006/0219773 A1* | 10/2006 | Richardson | G06K 9/033 235/379 |
| 2014/0153830 A1* | 6/2014 | Amtrup | G06K 9/00442 382/190 |
| 2014/0270536 A1* | 9/2014 | Amtrup | G06K 9/00442 382/195 |
| 2017/0308964 A1* | 10/2017 | Morris | G06Q 50/06 |

* cited by examiner

DATABASE RETRIEVAL SYSTEM

FIELD OF TECHNOLOGY

This invention relates to retrieving information. Specifically, this invention relates to database retrieval systems.

BACKGROUND OF THE DISCLOSURE

Many entities receive payments. At times, a customer remitting a payment transmits only a check. When the amount of the payment or the destination account of the payment in unclear, the receiving entity may be required to employ an operator to analyze the check, contact the remitter of the check and contact other sources for information regarding the check and how or to what account it should be applied.

This process may be resource-intensive, time-consuming and possibly inaccurate. Therefore, there is a need for a system which, in response to receiving payments, reviews payments, stores customer data and retrieves the data from memory to determine customer information, account information and any other relevant information, and use the retrieved information to apply the payment correctly.

SUMMARY OF THE INVENTION

An apparatus for database retrieval, and payment application is provided. The apparatus may include a direct deposit account ("DDA") history datastore. The apparatus may include a receiver. The receiver may be configured to receive a payment. The payment may include a paper check.

The apparatus may also include a scanner. The scanner may be configured to simultaneously scan the check into a grayscale image and scan the check into a black and white image.

The apparatus may also include a processor. The processor may be configured to electronically review each pixel on the black and white image alone and in combination with surrounding pixels to determine an arrangement of shaded pixels. When the arrangement of shaded pixels is determined to be above a predetermined threshold of similarity to a predefined set of characters, the processor, using optical character recognition software, may determine a subset of characters. The processor may also store the subset of characters in a computer-readable memory. In some embodiments, the predefined set of characters may be alpha-numeric characters.

The processor may also be configured to crawl the DDA history datastore to determine information which corresponds to the subset of characters stored in memory. The processor may be configured to retrieve the corresponding information.

The apparatus may also include a GUI. The GUI may include the black and white image. The black and white image may be toggalably convertible between the grayscale image and the black and white image. The black and white image may be selectable. The toggle conversion feature may be utilized by selecting the image.

The GUI may also include the retrieved information which corresponds to the subset of characters stored in the memory. The GUI may also include an account number text entry field. The account number text entry field may accept user input corresponding to an account number. The GUI may also include an amount text entry field. The amount text entry field may accept user input correspond to the dollar amount of the check.

In some embodiments, the account number text entry field and/or the amount text entry field may be auto-populated. The auto-populated information may be the retrieved corresponding information. For example, the processor may determine that a check has the number 1234567 written on the face of the check. The processor may then crawl the DDA history datastore to determine to what account 1234567 corresponds. The processor may determine that number 1234567 corresponds to a direct deposit account. The processor may determine that the remitter of the check intended that the payment be applied towards account number 1234567. Therefore, the processor may apply the amount of the check towards account number 1234567.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

A database retrieval system is provided. The database retrieval system may include a credit card history datastore. The database retrieval system may include a DDA history datastore. The database retrieval system may include a home loan history datastore.

The system may also include a receiver. The receiver may be configured to receive one or more payments. The received payments may include a paper check.

In some embodiments, the payment may include a paper check and a remit stub. In some embodiments, the amount on the remit stub may not be the same as the amount on the check. In some embodiments, the information written on the check and/or the remit stub may be illegible. In some embodiments, the payment may include a plurality of paper checks. In some embodiments, the payment may include a plurality of paper checks and a remit stub. In some embodiments, the plurality of paper checks may be third-party checks.

The system may include a scanner. The scanner may simultaneously scan the check into a grayscale image and scan the check into a black and white image.

In other embodiments, the scanner may scan the check into a grayscale image and following the scanning of the check into a grayscale image, scan the check into a black and white image. In other embodiments, the scanner may scan the check into a black and white image and following the scanning of the check into a black and white image, scan the check into a grayscale image.

In other embodiments, when the payment includes more than a single check, the scanner may scan, either simultaneously, or subsequently, all parts of the payments—i.e., a remit stub, multiple checks, etc. into either a black and white image or a grayscale image, or both.

The system may also include a processor. The processor may be configured to electronically review each pixel on the black and white image alone. The processor may be configured to electronically review each pixel on the black and white image in combination with surrounding pixels to determine an arrangement of shaded pixels. When the arrangement of shaded pixels is determined to represent characters in a predefined set of characters, e.g., an alphabet or numerical list, the processor, using optical character recognition software, may determine a subset of represented characters. The processor may store the subset of represented characters in a computer-readable memory.

The processor may crawl the credit card, home loan and/or DDA history datastores to determine information which corresponds to the subset of characters stored in the memory. The processor may retrieve the corresponding information from the respective datastore.

The system may include a GUI. The GUI may include the black and white image. The black and white image may be toggalably convertible between the grayscale image and the black and white image. The GUI may also include the retrieved information which corresponds to the subset of characters. The GUI may also include an account number text entry field. The account number text entry field may accept user input corresponding to an account number. The GUI may include an amount text entry field. The amount text entry field may accept user input corresponding to a dollar amount of the check.

In some embodiments, the black and white image and/or the grayscale image is not divided into sectors.

In some embodiments, the GUI is presented to two distinct operators. Upon receipt of the same account number user input and the same dollar amount user input by both operators, the payment may be transmitted for further processing. The transmission may be performed using a transmitter. The further processing may be performed independent of user interaction.

In some embodiments, the GUI may be presented to one operator. In these embodiments, upon receipt of account number user input and dollar amount user input by the operator, the payment may be transmitted, via a transmitter, for further processing independent of user interaction.

In some embodiments, upon transmission of the payment for further processing, the grayscale image may be discarded. In these embodiments, the black and white image may be retained. In certain embodiments, the black and white image may be retained in a batch file with other black and white images.

In embodiments where the payment includes a document in addition to the one check, such as a remit stub or another check, the scanner may also scan the additional documents in both black and white and grayscale images.

In such embodiments, the GUI may present the user the additional documents. In these embodiments, the additional documents may be toggalably convertible between the grayscale image and the black and white image. In these embodiments, the GUI may include a plurality of dollar amount text entry fields. Each of the plurality may correspond to a single check. In these embodiments, upon entry of account number user input and dollar amount user input, the processor may discard the grayscale images and retain the black and white images in a batch file.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

Figure 1:
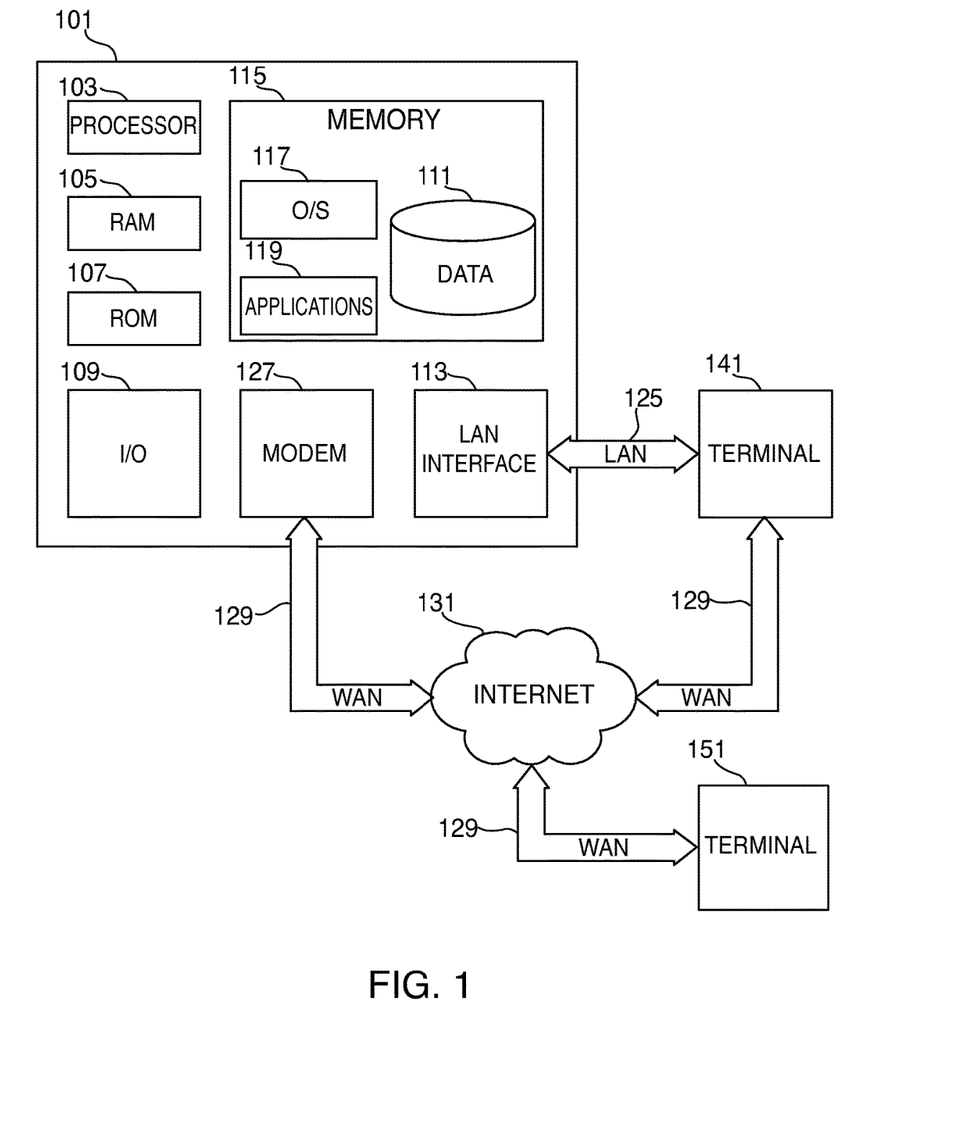
FIG. 1 shows an illustrative apparatus in accordance with principles of the invention.

FIG. 1 is an illustrative block diagram of mobile device system 100 based on a computer 101. The computer 101 may have a processor 103 for controlling the operation of the mobile device and its associated components, and may include RAM 105, ROM 107, input/output module 109, and a memory 115. The processor 103 will also execute all software running on the computer—e.g., the operating system. Other components commonly used for computers such as EEPROM or Flash memory or any other suitable components may also be part of the computer 101.

The memory 115 may be comprised of any suitable permanent storage technology—e.g., a hard drive. The memory 115 stores software including the operating system 117 any application(s) 119 along with any data 111 needed for the operation of the system 100. Alternatively, some or all of computer executable instructions may be embodied in hardware or firmware (not shown). The computer 101 executes the instructions embodied by the software to perform various functions.

Input/output ("I/O") module may include connectivity to a microphone, keyboard, touch screen, and/or stylus through which a user of computer 101 may provide input, and may also include one or more speakers for providing audio output and a video display device for providing textual, audiovisual and/or graphical output.

System 100 may be connected to other mobile device systems via a LAN interface 113.

System 100 may operate in a networked environment supporting connections to one or more remote computers, such as terminals 141 and 151. Terminals 141 and 151 may be personal computers or servers that include many or all of the elements described above relative to mobile device system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program(s) 119, which may be used by computer 101, may include computer executable instructions for invoking user functionality related to communication, such as email, Short Message Service (SMS), and voice input and speech recognition applications.

Computer 101 and/or terminals 141 or 151 may also be mobile devices including various other components, such as a battery, speaker, and antennas (not shown).

Terminal 151 and/or terminal 141 may be portable devices such as a laptop, cell phone, Blackberry™, or any other suitable device for storing, transmitting and/or transporting relevant information. Terminals 151 and/or terminal 141 may be other mobile devices. These mobile devices may be identical to mobile device system 100 or different. The differences may be related to hardware components and/or software components.

Figure 2:
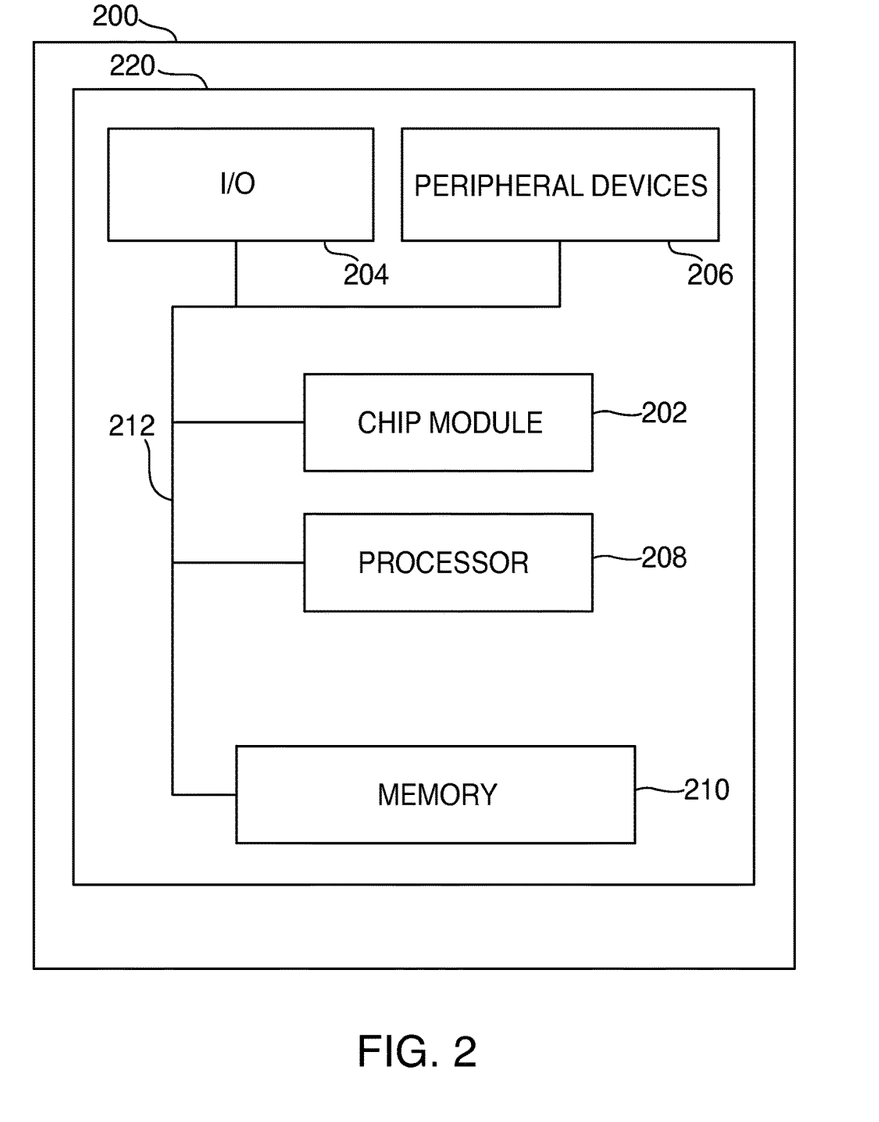
FIG. 2 shows an illustrative apparatus in accordance with principles of the invention.

FIG. 2 shows illustrative apparatus 200. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may determine account numbers, retrieve DDA account information, retrieve credit card account information, retrieve home loan account information, determine corresponding information, extract information from paper checks; and machine-readable memory 210.

Machine-readable memory 210 may be configured to store in machine-readable data structures: account numbers, remit stub information, check information, personal user information and any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
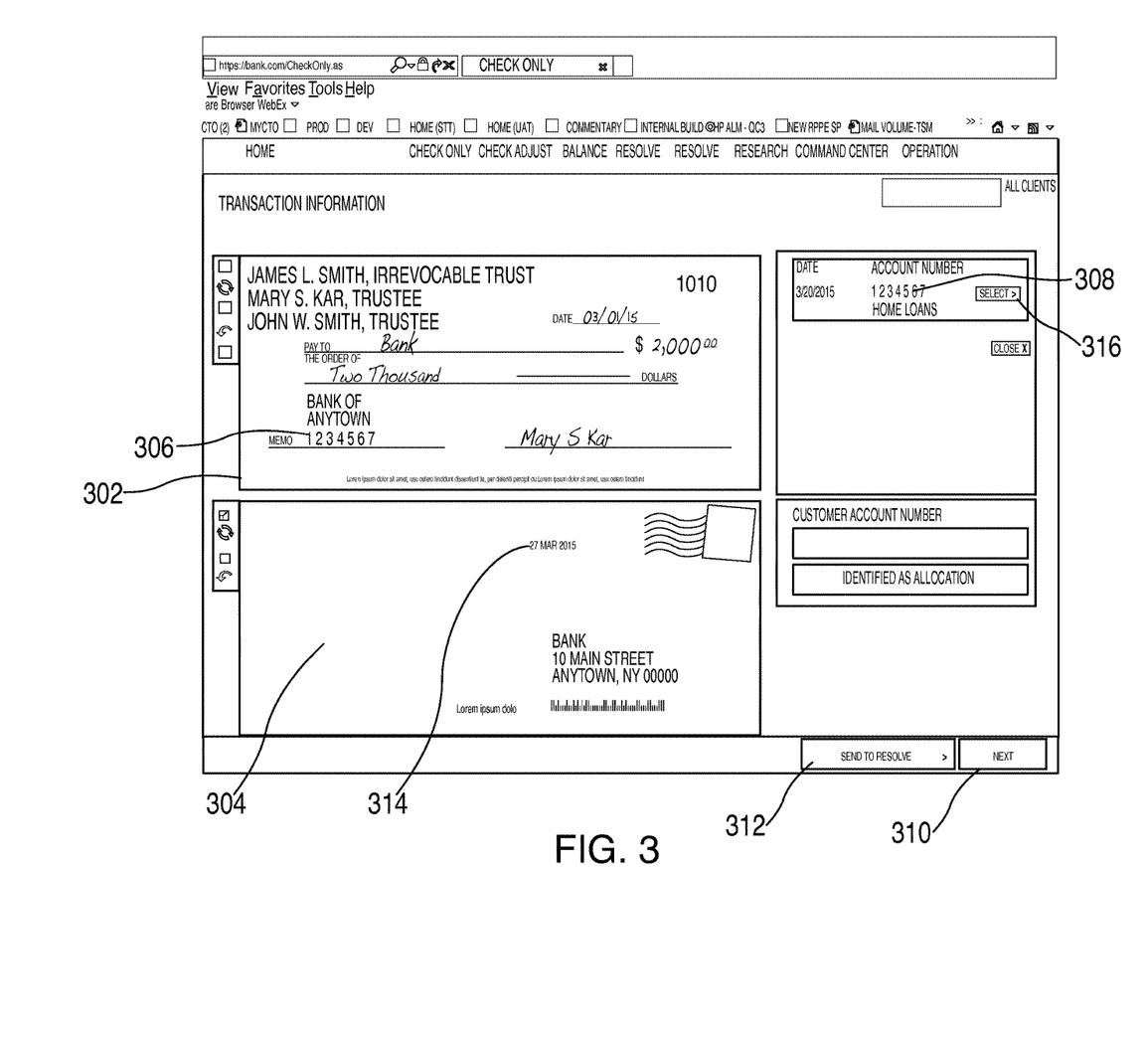
FIG. 3 shows an illustrative GUI in accordance with the principles of the invention.

FIG. 3 shows an illustrative GUI. Check 302 may have been remitted to an entity without a remit stub. Check 302 may have been remitted in envelope 304. The database retrieval system may have electronically reviewed check 302. The database retrieval system may have determined an account number, as shown at 308. The account number may have been written on the face of the check, as shown at 306.

In the event that check 302 is illegible, the database retrieval system may review a DDA account history associated with the account number shown at 308. The database retrieval system may recognize that a customer associated with check 302 may remit a two thousand dollar check on the fifteenth day of each month for account number 1234567. The database retrieval system may recognize that check 302 was postmarked on Mar. 27, 2015, as shown at 314. Therefore, the database retrieval system may determine that check 302 may have a dollar amount of two thousand dollars. The database retrieval system may process check 302 for two thousand dollars into account number 1234567.

In the event that the database retrieval system was unable to determine the amount or the account associated with check 302, an operator viewing the GUI may select button 312, to send the payment for resolve processing. In the event that the operator chose the select button 316 to indicate that account number 1234567 is the correct account number, an operator may then select button 310, next, to view another payment.

Figure 4:
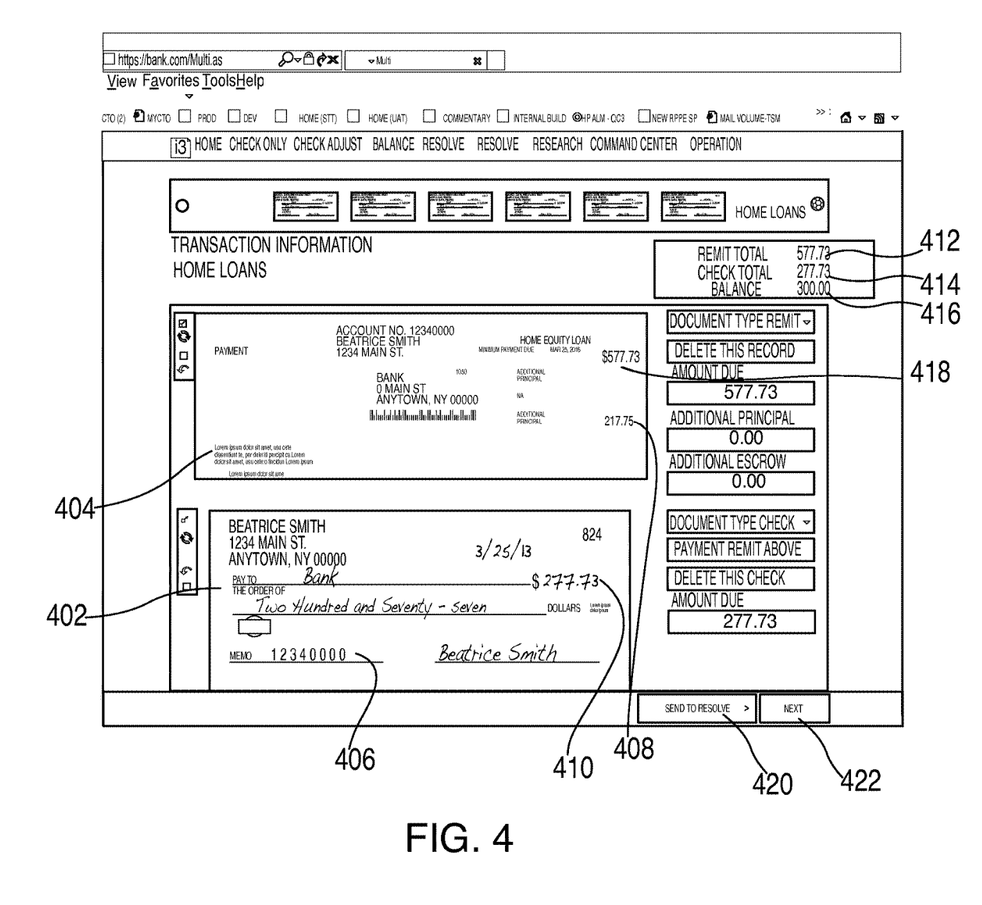
FIG. 4 shows an illustrative GUI in accordance with the principles of the invention.

FIG. 4 shows an illustrative GUI. The GUI may be presented to an operator. In FIG. 4, a customer mailed remit stub 404 and check 402. The minimum payment due, as shown at 418, is $577.73. The customer wrote that the check had an amount of $217.73, as shown at 408. The customer wrote out the check for $277.73, as shown at 410. The database retrieval system indicates the discrepancy at 412 (remit total: 577.73), 414 (check total: 277.73) and 416 (balance: 300.00). The check total of $277.73 may be $300.00 less than the amount due. The customer may have a $300.00 balance after remitting check 402 which amounted to $277.73.

The customer wrote the account number (Ser. No. 12/340, 000) on the face of the check as shown at 406.

An operator may have determined that the customer wrote an incorrect number on the remit stub. After ensuring the accuracy of the payment, the operator may select next button 422 to retrieve another payment. In the event that the operator is unable to the determine payment, the operator may select send to resolve, as shown at 420.

Figure 5:
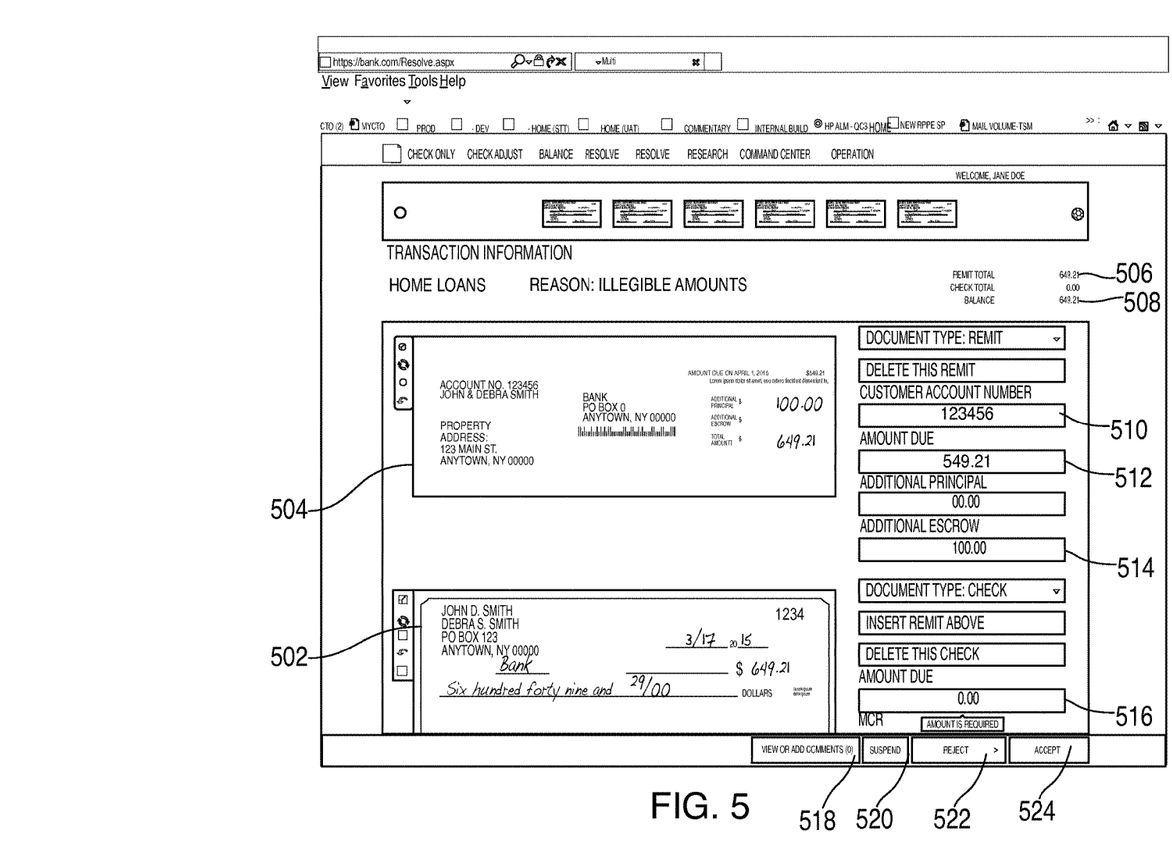
FIG. 5 shows an illustrative GUI in accordance with the principles of the invention.

FIG. 5 shows an illustrative GUI. The handwritten portion of check 502 may be illegible. The database retrieval system may have determined that the remit total is $649.21, as shown at 506. Because the database retrieval system did not determine a check amount, the balance shown at 508 is the same amount as the remit total. The customer account number may be 123456, as shown at 510 and retrieved from the remit stub. The amount due may be 549.21, as shown at 512, and retrieved from the remit stub. The additional $100.00 may be entered, as shown at 514. An operator may be required to enter an amount of the check into amount text entry field, as shown at 516.

An operator may be able to view or add comments to the payment, as shown at 518. An operator may suspend the payment, as shown at 520. An operator may reject the payment, as shown at 522. An operator may also accept the payment, as shown at 524.

Figure 6:
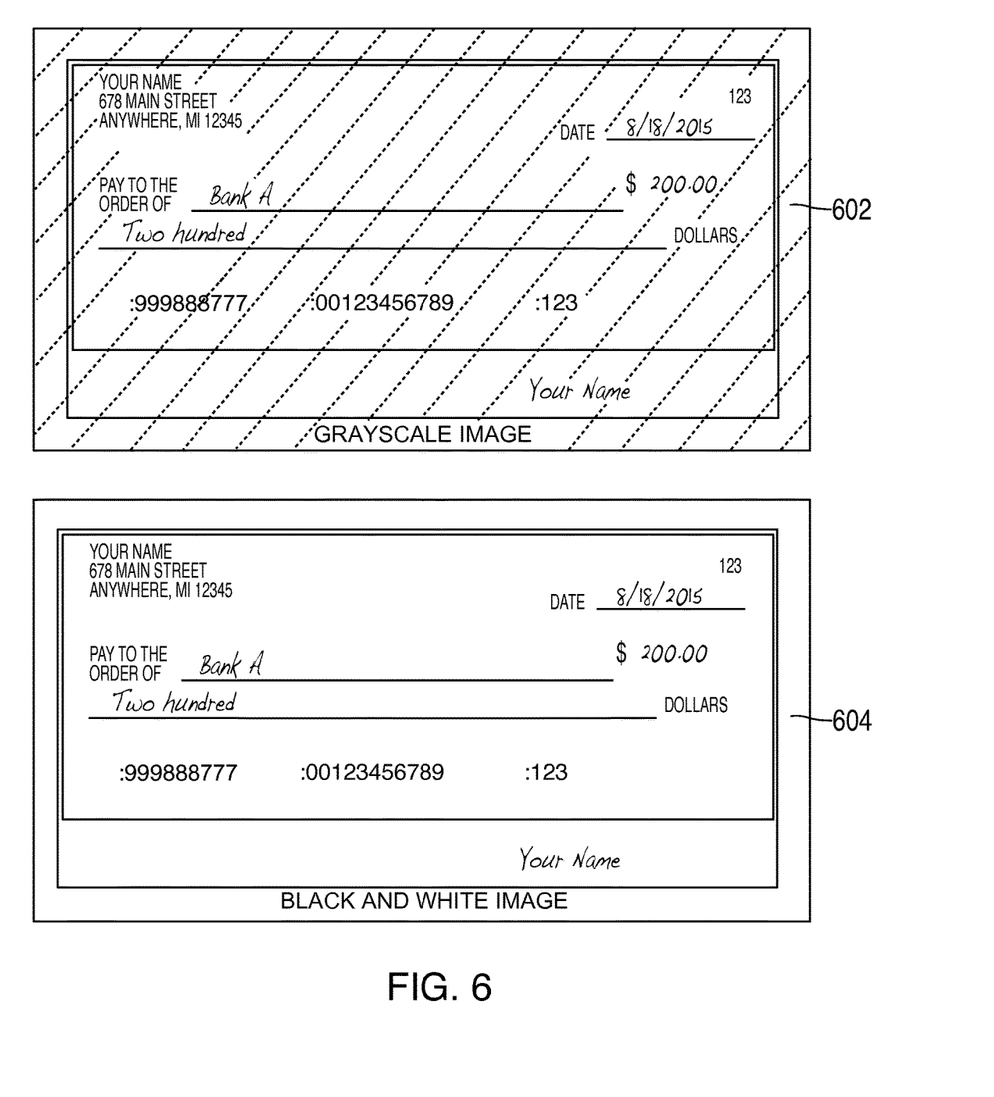
FIG. 6 shows an illustrative diagram in accordance with an embodiment of the invention.

FIG. 6 shows a grayscale image and a black and white image of a check. The grayscale image, shown at 602, may have been scanned simultaneously with the black and white image, shown at 604. The grayscale image may have been scanned subsequent to or prior to the scanning of the black and white image. Although the grayscale image is shown next to the black and white image, an operator may view only the grayscale image or the black and white image. The operator may also be able to toggle between the grayscale image and the black and white image by clicking on the image.

Figure 7:
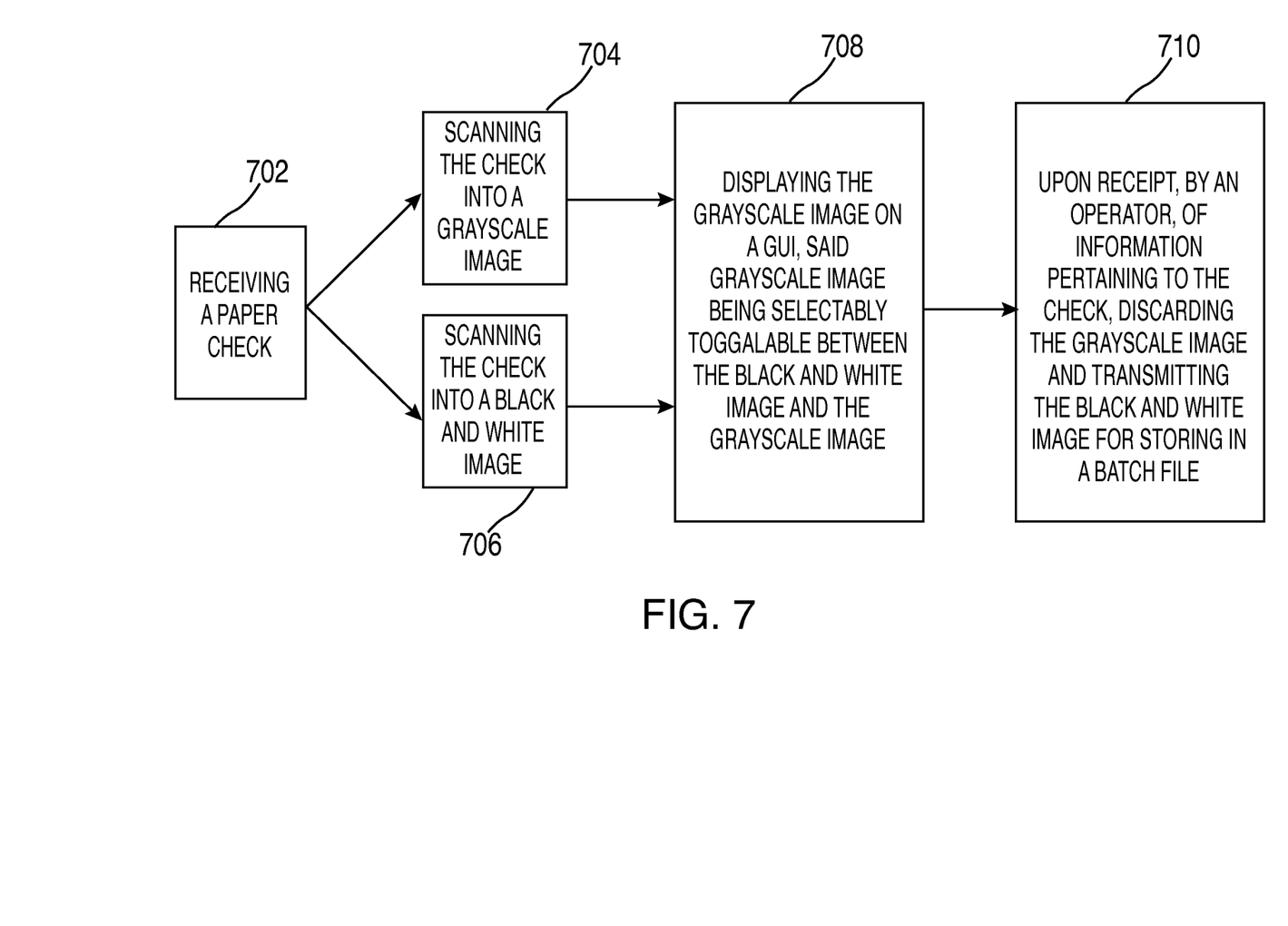
FIG. 7 shows an illustrative flow chart in accordance with an embodiment of the invention.

FIG. 7 shows an illustrative flow chart. Step 702 shows receiving a paper check. Step 704 shows scanning the check into a grayscale image. Step 706 shows scanning the check into a black and white image. It should be appreciated that steps 704 and 706 may be executed simultaneously. Step 708 shows displaying the grayscale image on a GUI. The grayscale image may be selectably toggalable between the black and white image and the grayscale image. In some embodiments, the black and white image may be displayed on the GUI, and the black and white image may be selectably toggalable between the black and white image and the grayscale image.

Step 710 show upon receipt, by an operator, of information pertaining to the check, discarding the grayscale image and transmitting the black and white image for storing in a batch file.

Figure 8:
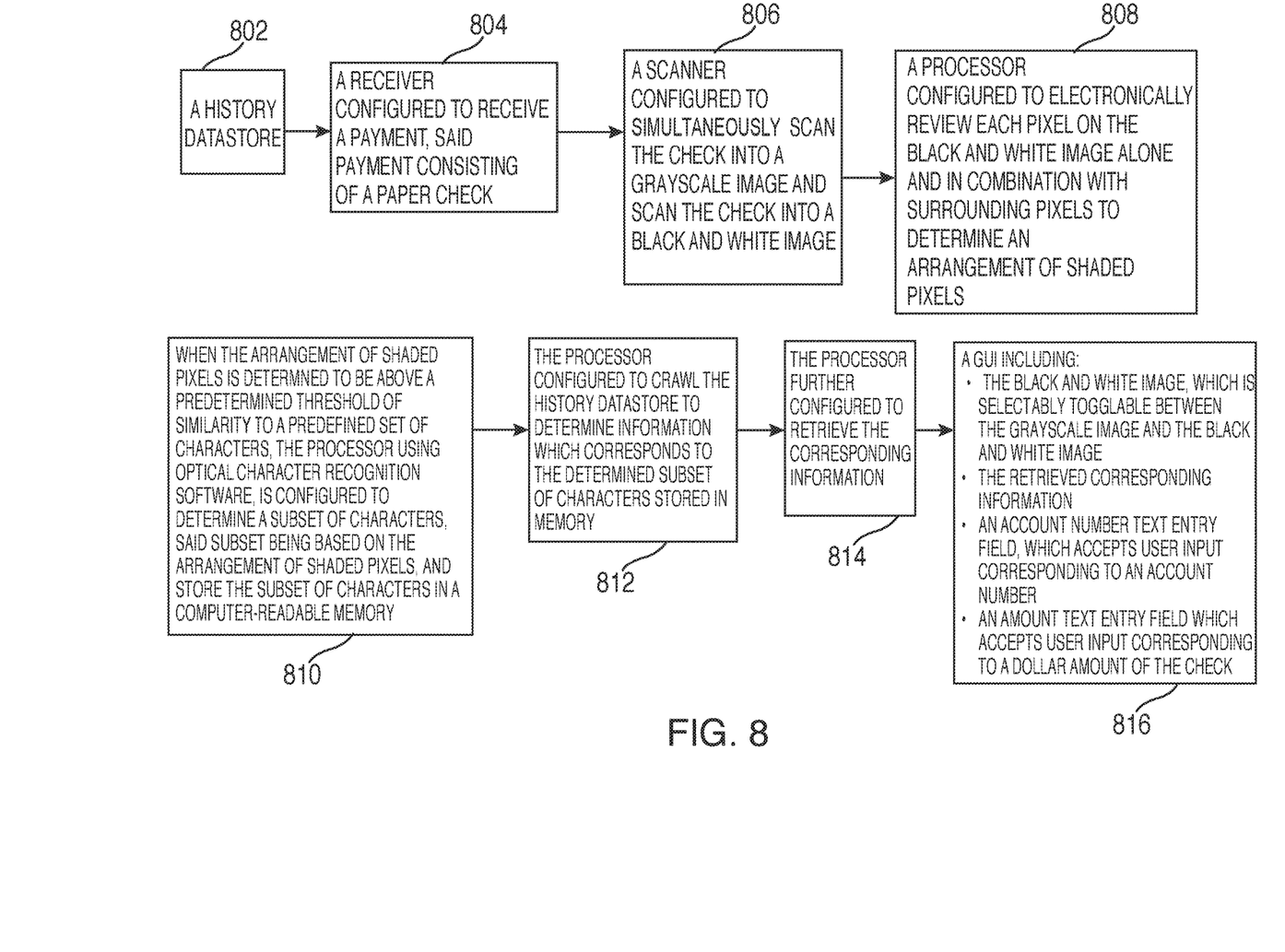
FIG. 8 shows an illustrative flow chart in accordance with an embodiment of the invention.

FIG. 8 shows a process flow. Step 802 shows the process may begin with a history datastore. Step 804 shows the process may include a receiver receiving a payment. The payment may consist of a paper check. Step 806 shows the process may include a scanner configured to simultaneously scan the check into a grayscale image and a black and white image.

Step 808 shows the processor may be configured to electronically review each pixel on the black and white image alone and in combination with surrounding pixels to determine an arrangement of shaded pixels.

Step 810 shows when the arrangement of shaded pixels is determined to be above a predetermined threshold of similarity to a predefined set of characters, the processor, using optical character recognition software, may be configured to determine a subset of characters. The subset of characters may be based on the arrangement of shaded pixels. The processor may also store the subset of characters in a computer-readable memory.

Step 812 shows the processor configured to crawl the history datastore to determine information which corresponds to the determined subset of characters stored in memory. Step 814 shows the processor further configured to retrieve the corresponding information.

Step 816 shows a GUI. The GUI may be presented to an operator. The GUI may include the black and white image. The black and white image may be selectably toggalable between the grayscale image and the black and white image. The GUI may also include a view of the retrieved corresponding information. The GUI may also include an account number text entry field. The account number text entry field may accept user input corresponding to an account number. The GUI may also include an amount text entry field. The amount text entry field may accept user input corresponding to the dollar amount of the check. The GUI may also include any additional text or number entry fields. The other entry fields may accept user input pertaining to customer information, e.g., customer telephone number, customer address, and any other suitable customer information.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer-readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

The invention may be described in the general context of computer-executable instructions, such as program modules, being executed by a computer. Generally, program modules may include routines, programs, objects, components, data structures, etc., that perform particular tasks or store or process data structures, objects and other data types. The invention may also be practiced in distributed computing environments where tasks are performed by separate (local or remote) processing devices that are linked through a communications network.

In a distributed computing environment, program modules may be located in both local and remote computer storage media including memory storage devices. In a distributed computing environment, devices that perform the same or similar function may be viewed as being part of a "module" even if the devices are separate (whether local or remote) from each other.

Thus, methods and apparatus for database retrieval system are provided. Persons skilled in the art will appreciate that the present invention can be practiced by other than the described embodiments, which are presented for purposes of illustration rather than of limitation, and that the present invention is limited only by the claims that follow.

What is claimed is:

1. A database retrieval system comprising:
   a direct deposit account ("DDA") history datastore;
   a receiver configured to receive a payment, said payment consisting of a paper check;
   a scanner configured to simultaneously:
      scan the check into a grayscale image; and
      scan the check into a black and white image;
   a processor configured to:
      determine the text of the paper check using optical character recognition technology;
      store the text of the paper check in a machine-readable memory;
      crawl the DDA history datastore for information that corresponds to the determined text; and
      retrieve the information that corresponds to the determined text; and
   a graphical user interface ("GUI") comprising:
      a display of the black and white image, said black and white image being togglable between the grayscale image and the black and white image;
      a display of the information that corresponds to the determined text;
      an account number text entry field, which accepts user input corresponding to an account number; and
      an amount text entry field, which accepts user input corresponding to a dollar amount of the check;
   wherein:
      the GUI is presented to two distinct operators, and upon receipt of the same account number user input and the same dollar amount user input by both operators, the payment is transmitted, via a transmitter, for further processing independent of user interaction; and
      upon transmission of the payment for further processing, the grayscale image is discarded and the black and white image is retained in a batch file.

\* \* \* \* \*